(12) United States Patent
Dighde et al.

(10) Patent No.: US 9,383,769 B2
(45) Date of Patent: Jul. 5, 2016

(54) DISPLAY DEVICE

(71) Applicant: Microsoft Technology Licensing, LLC, Redmond, WA (US)

(72) Inventors: Rajesh Manohar Dighde, Redmond, WA (US); Bernie Schultz, Bothell, WA (US); Nigel Keam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/719,741

(22) Filed: May 22, 2015

(65) Prior Publication Data
US 2015/0253811 A1 Sep. 10, 2015

Related U.S. Application Data

(63) Continuation of application No. 14/257,287, filed on Apr. 21, 2014, now Pat. No. 9,041,877, which is a continuation of application No. 12/889,212, filed on Sep. 23, 2010, now abandoned.

(51) Int. Cl.
*G02F 1/1333* (2006.01)
*G06F 1/16* (2006.01)
*G09F 9/30* (2006.01)
(Continued)

(52) U.S. Cl.
CPC ........ *G06F 1/1601* (2013.01); *G02F 1/133308* (2013.01); *G09F 9/30* (2013.01); *G09F 23/00* (2013.01); *G09F 23/06* (2013.01);
(Continued)

(58) Field of Classification Search
None
See application file for complete search history.

(56) References Cited

U.S. PATENT DOCUMENTS 5,214,522 A 5/1993 Tagawa
5,606,438 A 2/1997 Margalit et al.
(Continued)

FOREIGN PATENT DOCUMENTS

JP 2000227766 A 8/2000
JP 2002347168 A 12/2002
(Continued)

OTHER PUBLICATIONS

Smith-Gillespie, R., et al., "7.3: LCD Ruggedization in Displays with Optically Bonded AR Glass Lamination," Americas Display Engineering and Applications Conference Digest (ADEAC), Oct. 2006, 5 pages.
"Enhancement Services", CI Lumen, <http://www.ci-lumen.com/services/index.html>, Retrieved on Jan. 13, 2010, 3 pages.
"Optical Design of Rugged Displays", Found at <http://www.atlas-optical.com/doc/Rugged%20LCD%20Panel%20Assembly%20Design%20Manual.pdf>, Published on Aug. 16, 2005, 12 pages.
(Continued)

*Primary Examiner* — Mike Stahl
(74) *Attorney, Agent, or Firm* — Brandon Roper; Judy Yee; Micky Minhas

(57) ABSTRACT

A ruggedized display device is disclosed. The ruggedized display device may include an optical stack configured to resist a load up to a load threshold. The optical stack may include an electronic display including a top surface and a bottom surface, and a top protective component coupled to the top surface of the electronic display via a bonding material layer, to shield the electronic display. The top protective component and the bonding material layer may collectively have a first thickness of less than 1.0 millimeters. The optical stack may further include a bottom protective component, coupled to the bottom surface via a resiliently deformable adhesive layer, to support the electronic display from below. The bottom protective component and the adhesive layer may collectively have a second thickness less than 10.0 millimeters.

20 Claims, 3 Drawing Sheets

(51) Int. Cl.
 *G09F 23/00* (2006.01)
 *G09F 23/06* (2006.01)
(52) U.S. Cl.
 CPC ............... *G02F2001/133331* (2013.01); *G02F 2201/503* (2013.01)

(56) References Cited

U.S. PATENT DOCUMENTS

| | | | |
|---|---|---|---|
| 5,808,707 | A | 9/1998 | Niibori et al. |
| 5,818,559 | A * | 10/1998 | Yoshida ..................... 349/122 |
| 6,572,941 | B1 | 6/2003 | Murakami et al. |
| 6,654,083 | B1 | 11/2003 | Toda et al. |
| 6,955,840 | B2 | 10/2005 | Kim |
| 2002/0131141 | A1 | 9/2002 | Saitoh |
| 2004/0085492 | A1 | 5/2004 | Saitoh |
| 2006/0114387 | A1 | 6/2006 | Song et al. |
| 2006/0152648 | A1 | 7/2006 | Kim et al. |
| 2009/0161037 | A1 | 6/2009 | Lazarev |
| 2010/0013790 | A1 | 1/2010 | Ahn et al. |
| 2010/0014034 | A1 | 1/2010 | Matsuhira |
| 2010/0245706 | A1 | 9/2010 | Oohira |
| 2011/0019363 | A1 | 1/2011 | Vahlsing et al. |
| 2012/0020056 | A1 | 1/2012 | Yamagata et al. |

FOREIGN PATENT DOCUMENTS

| | | |
|---|---|---|
| JP | 2007114737 A | 5/2007 |
| JP | 2008083491 A | 4/2008 |

OTHER PUBLICATIONS

"15.0" XGA Industrial Touch Screen Monitor—M5150", StarPanel, <http://www.flatpanel.com/products/M5150.html>, Retrieved on Jan. 13, 2010, 2 pages.

"LCD Lamination Services", Thomas Electronics, <http://www.thomaselectronics.com/pdf/lcd_lamination_data.pdf>, Found as early as Mar. 17, 2004, 1 page.

"Fellowes TFT/LCD Screen Protector 17"", SHOPwiki, <http://www.shopwiki.co.uk/_Fellowes+TFT/LCD+Screen+Protector+17%22?o=140876768&s=435608&>, Retrieved on Jan. 13, 2010, 2 pages.

The State Intellectual Property Office of China, Office Action and Search Report issued in Chinese Patent Application No. 201110285450.6, May 6, 2013, China, 13 pages.

The State Intellectual Property Office of China, Office Action and Supplemental Search Report issued in Chinese Patent Application No. 201110285450.6, Dec. 4, 2013, China, 13 Pages.

United States Patent and Trademark Office, Non-Final Office Action issued in U.S. Appl. No. 12/889,212, Sep. 20, 2013, U.S., 9 Pages.

United States Patent and Trademark Office, Non-Final Office Action issued in U.S. Appl. No. 14/257,287, Oct. 8, 2014, U.S., 6 Pages.

United States Patent and Trademark Office, Notice of Allowance issued in U.S. Appl. No. 12/889,212, Jan. 22, 2014, U.S., 5 Pages.

The State Intellectual Property Office of China, Notice of Allowance issued in Chinese Patent Application No. 201110285450.6, Apr. 14, 2014, China, 3 Pages.

United States Patent and Trademark Office, Notice of Allowance issued in U.S. Appl. No. 14/257,287, Feb. 3, 2015, U.S., 6 Pages.

* cited by examiner

DISPLAY DEVICE

CROSS REFERENCE TO RELATED APPLICATIONS

This application is a continuation of U.S. patent application Ser. No. 14/257,287, filed on Apr. 21, 2014, which is a continuation of U.S. patent application Ser. No. 12/889,212, filed on Sep. 23, 2010, now abandoned, and titled "RUGGEDIZED DISPLAY DEVICE" the entire disclosure of each of which is incorporated by reference.

BACKGROUND

Flat screen displays have become both thinner and available in larger screen sizes in recent years. Some of these flat screen displays also include touch and multi-touch sensing capabilities. These thinner, wider, and touch-sensitive displays have been employed in various operating environments, such as horizontally oriented multi-touch tabletop displays, or inclined kiosk displays, etc., in which the displays experience forces on their display surface during use. Unfortunately, conventional flat screen displays can be easily damaged by such forces resulting in high replacement costs and frustrating downtime during repair. Additionally, forces on such thin displays may cause deflection that results in flashing, pooling, or an uneven surface on the display, resulting in an unsatisfactory user experience.

SUMMARY

A ruggedized display device is disclosed. The ruggedized display device may include an optical stack configured to resist a load up to a load threshold. The optical stack may include an electronic display including a top surface and a bottom surface, and a top protective component coupled to the top surface of the electronic display via a bonding material layer, to shield the electronic display from above. The top protective component and the bonding material layer may collectively have a first thickness of less than 1.0 millimeters. The optical stack may further include a bottom protective component, positioned below the bottom surface via a resiliently deformable adhesive layer, to support the electronic display from below. The bottom protective component and the adhesive layer may collectively have a second thickness less than 10.0 millimeters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A ruggedized display device is disclosed that incorporates a plurality of layers of protective materials in order to enable the device to withstand a load up to a load threshold. The ruggedized display device is configured to mount in a variety of orientations, such as a horizontal or tilt orientation, and may experience loading that includes a loading force with a component that is normal to the display surface. The ruggedized display device includes an optical stack having an electronic display sandwiched between impact resistant top and bottom protective components on a top side and a bottom side. These top and bottom protective components are layers that respectively shield the electronic display from above and support the electronic display device from below, thereby protecting it from damage due to loading.

Figure 1A:
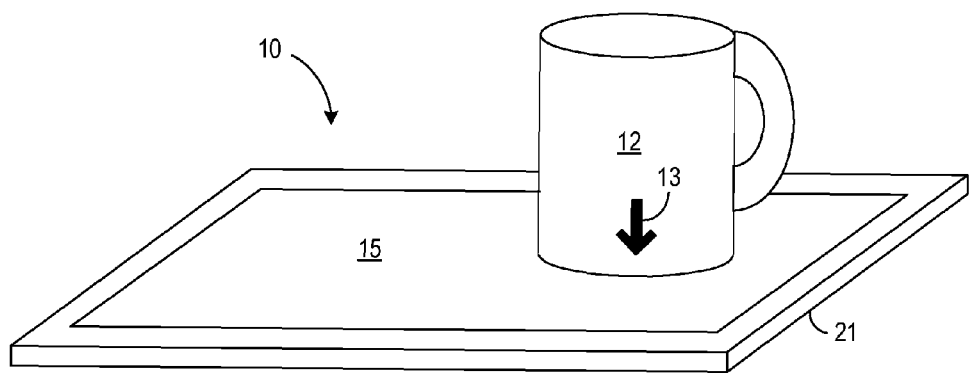
FIG. 1A is a perspective view of an embodiment of a ruggedized display device in a horizontal orientation.

FIG. 1A shows a schematic representation of one embodiment of a ruggedized display device 10 mounted in a horizontal orientation, for example as a tabletop display device. A load 12, illustrated as a coffee mug, placed on the ruggedized display device 10 exerts a force 13 on a top surface 15 of the ruggedized display device 10. The force may be an impact force as the load 12 is placed on the top surface 15, and may be a static force while the load 12 is at rest thereafter. Other examples of loads on horizontal configurations include people standing on a floor mounted display, leaning on a table top display, etc. A substantial component of the force 13 may be normal to the surface of the ruggedized display device 10. As discussed above, such forces may cause the ruggedized display device 10 mounted in the horizontal orientation to be vulnerable to damage from excessive impact and static forces, and also due to repeated loading over time.

Figure 1B:
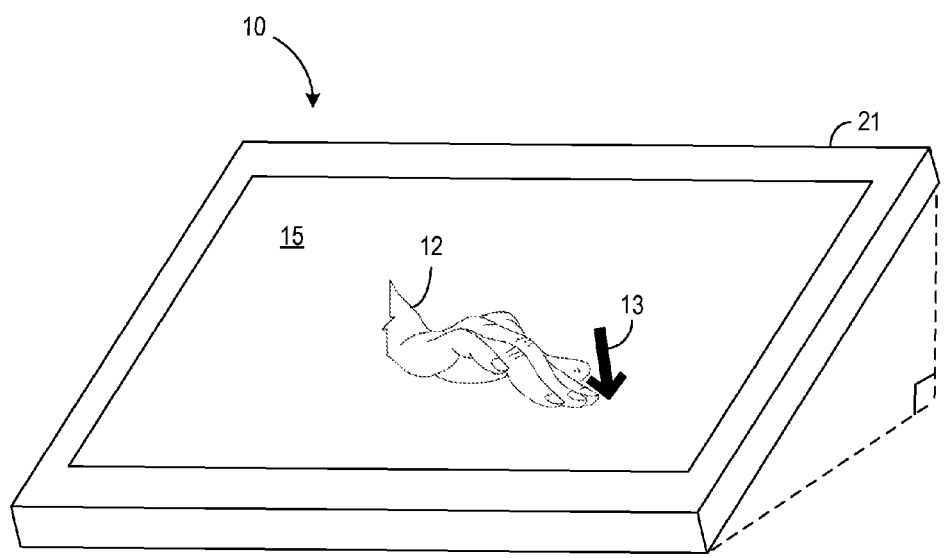
FIG. 1B is a perspective view of the ruggedized display device of FIG. 1A, in a tilt orientation.

FIG. 1B shows a schematic representation of the ruggedized display device 10 mounted in a tilt orientation, such as may be used in an information kiosk, for example. It will be appreciated that as with the horizontal orientation illustrated in FIG. 1A, mounting the ruggedized display device 10 in a tilt orientation also tends to subject a top surface 15 of the device to forces from a load 12 such as the user's hands or arms, or from objects bumping against it. At least a component of these forces may be normal to the top surface 15. Further, it will be appreciated that even in a vertical mounting orientation, the ruggedized display device may be subject to similar loading normal to the top surface 15. Excessive loading in these orientations, particularly excessive impact loading, may damage the ruggedized display device, as described above.

Figure 2:
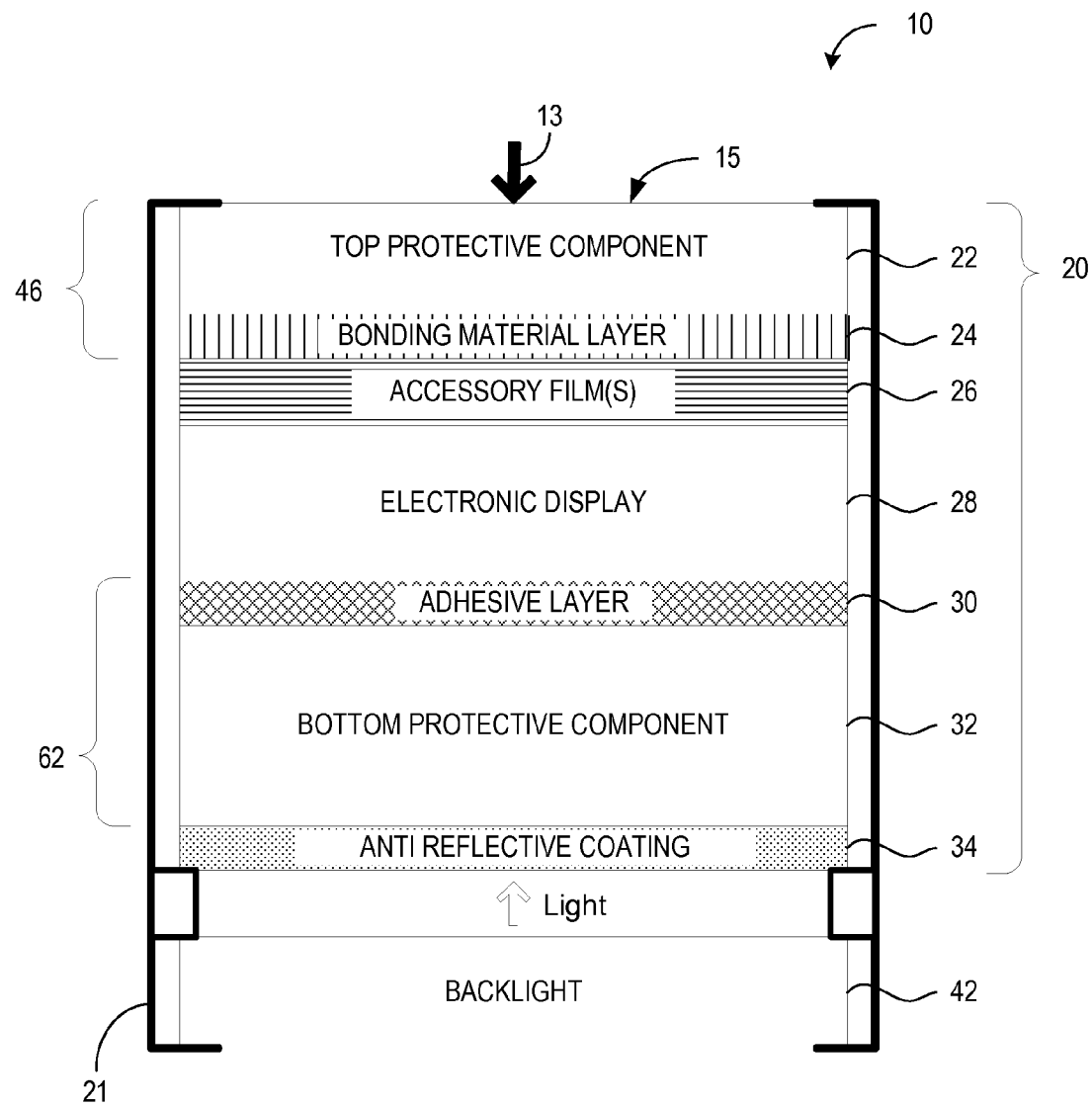
FIG. 2 is a schematic cross sectional view of the ruggedized display device of FIG. 1A.

As illustrated in FIG. 2, to protect the ruggedized display device 10 from damage caused by the excessive forces described above, the ruggedized display device 10 includes an optical stack 20 housed within a frame 21, with protective layers on a top side and bottom side. The optical stack 20 includes, in order from top to bottom, a top protective component 22, bonding material layer 24, one or more accessory films 26, electronic display 28, adhesive layer 30, bottom protective component 32 and an anti reflective coating 34. Backlight 42 emits light through optical stack 20 which forms an image on the top surface 15 of the display. With this configuration, including the protective layers of the top protective component 22 and the bottom protective component 22, the optical stack 20 can resist a force 13 from a load 12, up to the thresholds specified below.

Optical stack 20 is configured in such a way as to reduce deflection in one or more layers of the optical stack, which may occur for example, when ruggedized display device 10 is in a horizontal or tilt orientation due to the weight of the layers of the ruggedized display device and also due to loads applied to the top surface 15 of the ruggedized display device 10.

The various layers of optical stack 20 described above, may be formed of optically clear materials configured to transmit visible light, and in some embodiments infrared light as well.

Thus, the optical stack is comprised of materials that permit visible light and infrared light transmission through the optical stack. For example, materials may be chosen that transmit infrared wavelengths of up to about 2800 nm and up to about 92% of visible light wavelengths, as one non-limiting example. These figures are merely illustrative, and it will be appreciated that alternative materials may be chosen that transmit more or less of the infrared and visible light spectrum, as appropriate for the specific application.

Top protective component 22 is coupled to electronic display 28 via bonding material layer 24. In some examples, the top protective component 22 may mount directly to the electronic display 28 via the bonding material layer, and in other examples, one or more accessory films 26 may be sandwiched between the electronic display 28 and the top protective component 22.

The top protective component 22 is comprised of an optically clear material with high impact durability and high impact resistance, such as chemically strengthened glass, and may range from 0.1 millimeters to 1.0 millimeters in thickness. Alternatively, the top protective component 22 may range from 0.3 millimeters to 0.8 millimeters in thickness, and in some examples, may be 0.45 millimeters. These dimensions have been found to provide strength yet reduce parallax. Further, these dimensions have been found to reduce parallax to a level that enables sensors embedded in the electronic display, such as in-pixel optical sensors, to function for touch and object recognition. Further, a relatively thin top protective layer such as this has been found to provide a better user experience for applications involving a stylus. Chemically strengthened glass is provided as one example due to its material properties such as high impact durability (high retained strength after use). Further, the chemically strengthened glass may have a high impact resistance (flexural strength), which in one example is designed to resist up to a 4 kg load, for example. In addition to chemically strengthened glass, it will be appreciated that top protective component 22 may be comprised of additional or alternative optically clear materials.

Bonding material layer 24 is comprised of an optically clear material and may range in thickness from about 0.1 millimeters to 1.0 millimeters. Bonding material layer 24 may be applied to a surface of the accessory film 26 of the electronic display 28. Bonding material layer 24 may be a DUPONT® VERTAK® material or a SONY® optically clear adhesive, which are provided as non-limiting examples. In another example, bonding material layer 24 may be bonded directly to electronic display 28, and the accessory film 26 may be omitted. To reduce the effect of parallax, enable the use of sensing elements within the electronic display 28, and improve visibility to the user, the top protective component 22 and bonding material layer 24 may collectively have a first thickness 46 that is less than 1.0 millimeters, in one embodiment. In another embodiment, the first thickness may be less than 0.8 millimeters, and more specifically, less than 0.6 millimeters.

One or more accessory films 26 may be employed to condition the light emitted from the electronic display 28. Accessory films 26 may include an antireflective film, an antiglare film, a conductive film and/or a privacy film, as non-limiting examples. These one or more accessory films 26 may be applied to the top surface of the electronic display 28, between the electronic display 28 and the bonding material layer 24. It will be appreciated that the top surface of the electronic display 28 is often a polarizing layer. While one accessory film 26 is depicted in the illustrated embodiment, it will be appreciated that a plurality of films may be used in combination in other embodiments. Further, in another embodiment, accessory film 26 may be omitted, and electronic display 28 may be bonded directly to top protective component 22 via bonding material layer 24. In yet another embodiment, an accessory film 26, such as an antireflective film, may be applied to a top surface 15 of the top protective component 22.

Electronic display 28 may be a liquid crystal display (LCD) or an organic light emitting diode (OLED) display comprised of a plurality of light emitting pixels, as one example. Electronic display 28 may also be touch sensitive or multi-touch sensitive. Various touch sensitive technologies may be employed. For example, the electronic display 28 may include optical sensors, which may be positioned in each pixel of the display, to sense light, and output from these optical sensors may be processed to detect multiple touches on the top surface of the display. These optical sensors may be configured to sense visible light and infrared light, in one example. For instance, the optical sensor may be an active pixel sensor (APS), such as a complementary metal-oxide semiconductor (CMOS) or any other APS configured to sense visible light and infrared light.

As an alternative to in-pixel optical sensors, a capacitive layer may be provided, which is configured to detect touch on the top surface of the display through changes in detected capacitance caused by the touch.

The bottom protective component 32 is positioned below the bottom surface of the electronic display 28, and may be coupled to the electronic display 28 via an adhesive layer 30. Bottom protective component 32 is comprised of an optically clear material such as a plastic, for example poly methyl methacrylate (PMMA); although it will be appreciated that bottom protective component 32 may be comprised of additional or alternative optically clear materials. As another example, bottom protective component 32 may be comprised of tempered glass. In one embodiment, the thickness of the bottom protective component may range from about 3 millimeters to about 10 millimeters. In other embodiments, the thickness of the bottom protective component may range from about 4 millimeters to 8 millimeters, and in some embodiments, more specifically, is about 4.7 millimeters. Thicknesses in these ranges provide suitable support on the underside of the optical stack 20 to resist normal loading on the top surface of the stack.

Adhesive layer 30 is comprised of an optically clear material that is resiliently deformable and has a coefficient of thermal expansion that is compatible with the bottom protective component 32. Since it is resiliently deformable, the adhesive layer 30 is configured to resiliently accommodate deflection in the electronic display 28 due to gravity or loading. This concept is discussed further below in reference to FIG. 3. In addition, the adhesive layer 30 is configured to resiliently accommodate different thermal expansion in the bottom surface of the electronic display 28 and the top surface of the bottom protective component 32, which occurs as the electronic display 28 heats up. Additionally, adhesive layer 30 together with bottom protective component 32 serve as a support for the electronic display 28, and thus substantially inhibit electronic display 28 from deflecting excessively when a load is applied to a top surface of the ruggedized display device 10. It will be appreciated that the thickness of the adhesive layer 30 may range from about 0.2 millimeters to about 1.0 millimeters. In other embodiments the thickness may range from about 0.4 millimeters to about 0.8 millimeters and, more specifically, may be about 0.5 millimeters. These thicknesses have been found suitable to accommodate sag and relative lateral movement due to differences in thermal expansion, discussed above. These thicknesses have also been found to provide sufficient support to reduce pooling and flashing in the electronic display 28. In addition, these thicknesses have been found to reduce both upward and downward deflection of top surface 15, which reduces the tendency of the optical stack 20 to break prematurely by reducing tensile stress on the upper layers of the optical stack, including top protective component 22, bonding material layer 24, accessory films 26, electronic display 28 and adhesive layer 30.

In one embodiment, the bottom protective component 32 and adhesive layer 30 collectively have a second thickness 62 that is greater than first thickness 46. In one embodiment, the second thickness 62 may be less than 10 millimeters. In other embodiments, the second thickness 62 may be less than 8 millimeters, and more specifically may be about 5.2 millimeters. These thicknesses have the above benefits of support, accommodation of sag, and accommodation of differences in thermal expansion of the adjacent layers, as well as the benefit of keeping the optical stack 20 compact in size.

An anti reflective coating 34 is positioned on a bottom surface of the bottom protective component 32 and serves as to allow backlight 42 to transmit light through optical stack 20 without reflection of infrared wavelengths or visible light wavelengths.

With the above construction, optical stack 20 is configured to resist a load up to a load threshold of 1000 N for a static load and 10 J for a dynamic load. In other embodiments, the optical stack may be configured to resist a load of up to a load threshold of 800 N for a static load and 8 J for a dynamic load, or more specifically up to about 800 N for a static load and 7 J for a dynamic load.

Figure 3:
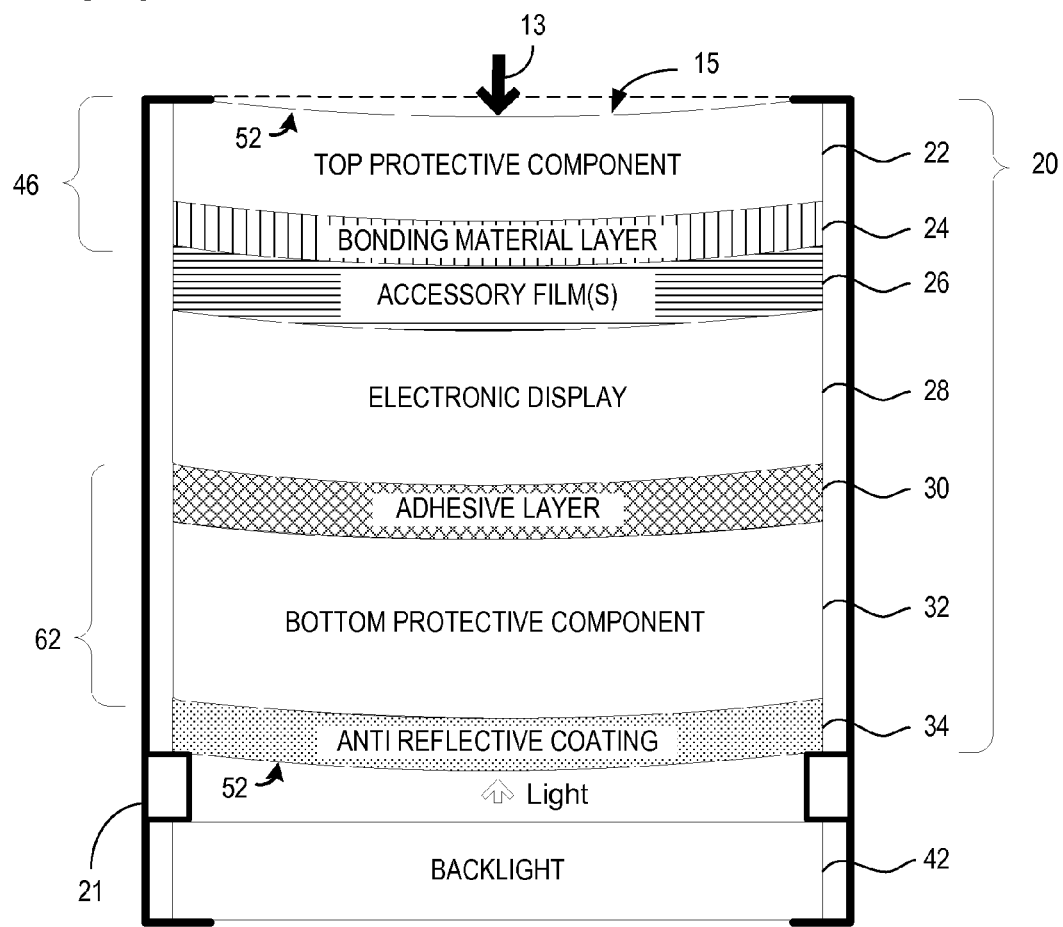
FIG. 3 is a schematic cross sectional view of the ruggedized display device of FIG. 1A, showing sag in an optical stack.

FIG. 3 illustrates deflection in the various layers of the optical stack 20, which may be caused by sag under the influence of gravity, or loading from a force 13 on a top surface 15 of the optical stack 20. Generally, the deflection will be more pronounced in larger sized displays. Typically, the ruggedized display device 10 has a large format screen; for example, in one embodiment, the ruggedized display device 10 has a viewable area that diagonally measures 20 inches or greater. In other embodiments, the screen size is 27 inches or greater, and more specifically may be 40 inches. As a result of the sag, a curvature 52 may develop on the top and bottom surfaces of the bottom protective component 32. In one example, for a 40 inch display size the curvature 52 may result in a center of screen deflection of about 1.5 millimeters in a ruggedized display device mounted in a horizontal orientation.

The electronic display 28 and top protective component 22 are relatively thin and subject to deflection due to loading and sag due to gravity; however, the bottom protective component is positioned below the electronic display 28 and supports it in a manner that reduces the deflection in the electronic display 28 and layers above it. To maintain the bond between the bottom protective component 32 and the adhesive layer 30 even in the presence of sag of the bottom protective component 32, adhesive layer 30 is configured to resiliently accommodate the curvature 52 of the bottom protective component.

In addition to sag, the adhesive layer 30 is configured to absorb relative lateral movement caused by differences in thermal expansion of the electronic display and the bottom protective component. In one particular example, the coefficient of thermal expansion for the electronic display may differ by a factor of 10 from that of the bottom protective layer. As the electronic display heats up, the electronic display 28 and the bottom protective component 32 expand at different rates, creating the lateral movement and the conditions for shear forces on the adhesive layer 30. However, with the construction and material properties described above, the adhesive layer 30 is configured to accommodate such relative lateral movement due to differences in thermal expansion, while still keeping the integrity of its bonds to each of the layers above and below it.

As discussed above, ruggedized display device 10 allows the electronic display 28 to tolerate loads with force components that are normal to the top surface of the display, as are often experienced in a horizontal or tilt orientation due to the optical stack 20 arrangement. The optical stack includes a top and bottom protective component and several internal layers that are laminated layers which are adhered to each other, and mechanically joined around a perimeter by a frame. Such a construction has been found useful to resist deflection normal to the top surface, thereby inhibiting cracking, and also to resist damage from impact loads. This construction also helps to reduce pooling, flashing and early breakage due to deflection of the optical stack, as discussed above. By use of such the embodiments described herein, the functional lifespan of display devices subject to loading in the manner described herein may be extended, reducing replacement costs and repair downtime.

This ruggedized display device 10 has a further advantage in that it is configured to guide light from the backlight 42 to a top surface 15 of the optical stack, and evenly distribute heat transfer from the backlight 42 to the top surface 15. The optical stack 20 and its internal components, including the top protective component 22, bonding material layer 24, accessory films 26, electronic display 28, adhesive layer 30, bottom protective component 32 and anti reflective coating 34, act as thermal insulation between the backlight 42 and top surface 15. It will be appreciated that heat from backlight 42 is unevenly generated. The thermal insulation of the optical stack 20 helps evenly distribute the heat to avoid hot spots on the top surface 15 that exceed a predetermined threshold, which could adversely affect performance. This is advantageous in particular because some touch applications have difficulty operating correctly when the temperature of the top surface 15 exceeds a predetermined threshold, such as 42 C.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display device, comprising an optical stack configured to resist a load up to a load threshold, the optical stack including:

an electronic display including a top surface and a bottom surface;

one or more sensors embedded in the electronic display;

a top protective component coupled to the top surface of the electronic display via a bonding material layer, to shield the electronic display, the top protective component and the bonding material layer collectively having a first thickness of less than 1.0 millimeters; and a bottom protective component, coupled to the bottom surface via a resiliently deformable adhesive layer, to support the electronic display from below, the bottom protective component and the adhesive layer collectively having a second thickness less than 10.0 millimeters.

2. The display device of claim 1, wherein the one or more sensors include a sensor configured to detect touch input.

3. The display device of claim 1, wherein the one or more sensors include an in-pixel sensor.

4. The display device of claim 3, wherein the in-pixel sensor is an in-pixel optical sensor.

5. The display device of claim 3, wherein the in-pixel sensor is an in-pixel capacitive sensor.

6. The display device of claim 1, wherein the resiliently deformable adhesive layer is configured to accommodate deflection of and relative lateral movement between the electronic display and the bottom protective component.

7. The display device of claim 1, further comprising:
an accessory film positioned intermediate the top protective component and the electronic display.

8. An apparatus, comprising:
an electronic display including a top surface and a bottom surface;
one or more sensors embedded in the electronic display;
a top protective component coupled to the top surface of the electronic display via a bonding material layer, to shield the electronic display, the top protective component and the bonding material layer collectively having a first thickness of less than 1.0 millimeters; and
a bottom protective component, coupled to the bottom surface via a resiliently deformable adhesive layer, to support the electronic display from below, the bottom protective component and the adhesive layer collectively having a second thickness less than 10.0 millimeters.

9. The apparatus of claim 8, wherein the one or more sensors include a sensor configured to detect touch input.

10. The apparatus of claim 8, wherein the one or more sensors include an in-pixel sensor.

11. The apparatus of claim 10, wherein the in-pixel sensor is an in-pixel optical sensor.

12. The apparatus of claim 10, wherein the in-pixel sensor is an in-pixel capacitive sensor.

13. The apparatus of claim 8, wherein the resiliently deformable adhesive layer is configured to accommodate deflection of and relative lateral movement between the electronic display and the bottom protective component.

14. The apparatus of claim 8, further comprising:
an accessory film positioned intermediate the top protective component and the electronic display.

15. A device comprising:
a touch-input processor; and
an optical stack configured to resist a load up to a load threshold, the optical stack including:
an electronic display including a top surface and a bottom surface;
one or more sensors embedded in the electronic display;
a top protective component coupled to the top surface of the electronic display via a bonding material layer, to shield the electronic display, the top protective component and the bonding material layer collectively having a first thickness of less than 1.0 millimeters; and
a bottom protective component, coupled to the bottom surface via a resiliently deformable adhesive layer, to support the electronic display from below, the bottom protective component and the adhesive layer collectively having a second thickness less than 10.0 millimeters.

16. The device of claim 15 wherein the one or more sensors include a sensor configured to detect touch input and coupled operatively to the touch-input processor.

17. The device of claim 15 wherein the one or more sensors include an in-pixel sensor.

18. The device of claim 17 wherein the in-pixel sensor is an in-pixel optical sensor.

19. The device of claim 17 wherein the in-pixel sensor is an in-pixel capacitive sensor.

20. The device of claim 15 further comprising an accessory film positioned intermediate the top protective component and the electronic display, wherein the resiliently deformable adhesive layer is configured to accommodate deflection of and relative lateral movement between the electronic display and the bottom protective component.

* * * * *